(12) United States Patent
Chiu et al.

(10) Patent No.: US 9,887,745 B2
(45) Date of Patent: Feb. 6, 2018

(54) COMMUNICATING METHOD FOR ANTENNA ARRAY COMMUNICATION SYSTEM, USER EQUIPMENT AND BASE STATION

(71) Applicant: INDUSTRIAL TECHNOLOGY RESEARCH INSTITUTE, Hsinchu (TW)

(72) Inventors: Sung-En Chiu, Hsinchu County (TW); Chia-Pang Yen, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 108 days.

(21) Appl. No.: 14/336,628

(22) Filed: Jul. 21, 2014

(65) Prior Publication Data

US 2015/0023260 A1    Jan. 22, 2015

Related U.S. Application Data

(60) Provisional application No. 61/857,222, filed on Jul. 22, 2013.

(30) Foreign Application Priority Data

Jun. 4, 2014    (TW) .............................. 103119345 A

(51) Int. Cl.
*H04B 7/04*    (2017.01)
*H04B 7/0408*    (2017.01)
(Continued)

(52) U.S. Cl.
CPC ......... *H04B 7/0408* (2013.01); *H04B 7/0434* (2013.01); *H04B 7/0456* (2013.01);
(Continued)

(58) Field of Classification Search
CPC ........... H04B 7/2123; H04J 2203/0069; H04Q 2213/394
See application file for complete search history.

(56) References Cited

U.S. PATENT DOCUMENTS 8,306,089 B2    11/2012    Merlin et al.
8,594,161 B2    11/2013    Kim et al.
(Continued)

FOREIGN PATENT DOCUMENTS

CN    1437420 A    8/2003
CN    1582043 A    2/2005
(Continued)

OTHER PUBLICATIONS

Taiwanese Office Action dated Aug. 14, 2015.
(Continued)

*Primary Examiner* — Jackie Zuniga Abad
(74) *Attorney, Agent, or Firm* — Rabin & Berdo, P.C.

(57) ABSTRACT

A communicating method for an antenna array communication system, a user equipment and a base station are provided. The communicating method includes the following steps. A plurality of beams which are formed by a plurality of antennas is transmitted by a base station, and some of the beams is selected by a user equipment. A beam set of the selected beams for the user equipment is configured by the base station. A pre-coding information is fed back to the base station according to the configured beam set by the user equipment.

21 Claims, 3 Drawing Sheets

(51) Int. Cl.
*H04B 7/0456* (2017.01)
*H04B 7/06* (2006.01)
*H04L 25/02* (2006.01)

(52) U.S. Cl.
CPC ........... *H04B 7/063* (2013.01); *H04B 7/0619* (2013.01); *H04B 7/0639* (2013.01); *H04L 25/021* (2013.01); *H04L 25/0248* (2013.01)

(56) References Cited

U.S. PATENT DOCUMENTS

| | | | |
|---|---|---|---|
| 2003/0181163 A1* | 9/2003 | Ofuji | H01Q 1/1257 455/25 |
| 2005/0037799 A1* | 2/2005 | Braun | H04W 16/28 455/525 |
| 2009/0015472 A1 | 1/2009 | Lozano | |
| 2010/0165914 A1 | 7/2010 | Cho et al. | |
| 2011/0142147 A1 | 6/2011 | Chen et al. | |
| 2012/0106470 A1 | 5/2012 | Clerckx et al. | |
| 2013/0163457 A1 | 6/2013 | Kim et al. | |
| 2013/0163544 A1 | 6/2013 | Lee et al. | |
| 2013/0343303 A1 | 12/2013 | Kim et al. | |

FOREIGN PATENT DOCUMENTS

| | | |
|---|---|---|
| CN | 101232356 A | 7/2008 |
| CN | 102428659 A | 4/2012 |
| CN | 103125083 A | 5/2013 |
| EP | 1507427 A1 | 2/2005 |
| TW | 200901655 A | 1/2009 |

OTHER PUBLICATIONS

Junyoung Nam et al., "Joint Spatial Division and Multiplexing: Realizing Massive MIMO Gains with Limited Channel State Information" 2012 46th Annual Conference on Information Sciences and Systems (CISS), pp. Mar. 1-6, 2012.

Wan Choi et al., "Opportunistic Space-Division Multiple Access With Beam Selection" IEEE Transactions on Communications, vol. 55, Issue 12, pp. 2371-2380, Dec. 2007.

Fredrik Rusek et al., "Scaling Up MIMO: Opportunities and challenges with very large arrays" IEEE Signal Processing Magazine, vol. 30, Issue 1, pp. 40-60, Jan. 2013.

Thomas L. Marzetta "Noncooperative Cellular Wireless with Unlimited Numbers of Base Station Antennas" IEEE Transactions on Wireless Communications, vol. 9, Issue 11, pp. 3590-3600, Nov. 2010.

Omar El Ayach et al., "The Capacity Optimality of Beam Steering in Large Millimeter Wave MIMO Systems" 2012 IEEE 13th International Workshop on Signal Processing Advances in Wireless Communications (SPAWC), pp. 100-104, Jun. 2012.

Theodore S. Rappaport "Millimeter Wave Cellular A road to 5G" IEEE ICC Plenary Presentation, Jun. 2013.

Chinese Office Action dated Mar. 3, 2017.

* cited by examiner

US 9,887,745 B2

COMMUNICATING METHOD FOR ANTENNA ARRAY COMMUNICATION SYSTEM, USER EQUIPMENT AND BASE STATION

This application claims the benefit of U.S. provisional application Ser. No. 61/857,222, filed Jul. 22, 2013, and the benefit of Taiwan application Serial No. 103119345, filed Jun. 4, 2014, the disclosures of which are incorporated by reference herein in its entirety.

TECHNICAL FIELD

The disclosure relates in general to a communicating method for an antenna array communication system, a user equipment and a base station.

BACKGROUND

With the development of communication technology, an antenna array is used for transmitting data. As the technology development, an antenna array is used in a LTE technology. For example, a diversity communication or a multiplexing communication can be used for the antenna array in the LTE technology.

In an antenna array, the number of the antennas might be larger than 100. The communication of the antenna array may be performed under a frequency division duplexing (FDD) mode or a time division duplexing (TDD) mode. In FDD mode, the feedback loading is large due to the large number of the antennas. It is needed to reduce the overhead loading when the antenna array is performed in FDD mode.

SUMMARY

The disclosure is directed to a communicating method for an antenna array communication system, a user equipment and a base station.

According to one embodiment, a communicating method for an antenna array communication system is provided. The communicating method includes the following steps. A plurality of beams which are formed by a plurality of antennas is transmitted by a base station, and some of the beams are selected by user equipment. A beam set of the selected beams for the user equipment is configured by the base station. A pre-coding information is fed back to the base station according to the configured beam set by the user equipment.

According to another embodiment, a user equipment of an antenna array communication system is provided. The user equipment includes a transceiver unit and a processing unit. The transceiver unit receives a plurality of beams which are formed by a plurality of antennas from a base station. The processing unit selects some of the beams. A beam set of the selected beams is configured for the user equipment. A pre-coding information is obtained according to the configured beam set by the processing unit and fed back to the base station by the transceiver unit.

According to an alternative embodiment, a base station of an antenna array communication system is provided. The base station includes a transceiver unit and a processing unit. The transceiver unit transmits a plurality of beams which are formed by a plurality of antennas. Some of the beams are selected by a user equipment. The processing unit configures a beam set of the beams for the user equipment. The transceiver unit receives a pre-coding information which is obtained according to the configured beam set by the user equipment.

Figure 1:
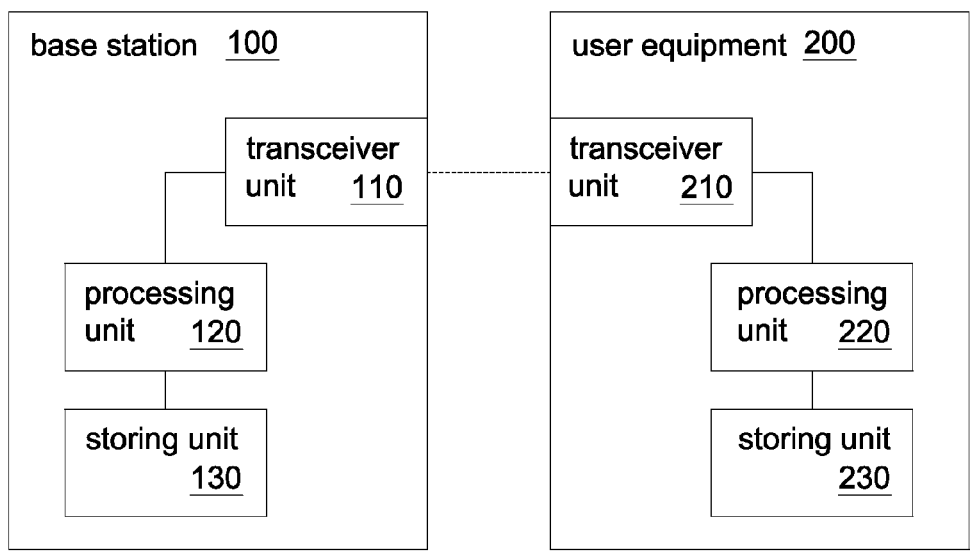
FIG. 1 shows an antenna array communication system.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing

DETAILED DESCRIPTION

The following notations are used in this disclosure.

$H_{M \times N}$: Physical MIMO channel.

$b_i$: directional beamforming weights that forms the i-th beam.

$B=[b_{k'_1} \ldots b_{k'_{n'}}]$: directional beamforming matrix, wherein n' is the number of beams and $k'_m \in \{1,2,\ldots,N\}$ is the selected beam index.

$W_{n' \times RI}$: precoder applied in base-band with corresponding rank (RI), wherein n' is the number of equivalent beamnical antenna ports.

$R=E\{H^H H\}$: Physical MIMO channel covariance matrix.

$$H_{B_{k'_{n'}}} = HB = H[b_{k'_1} \cdots b_{k'_{n'}}]:$$

Beamnical MIMO channel under beams.

$$R_{Ts} = E\{H_{B_{k'_{n'}}}(k,:)^H H_{B_{k'_{n'}}}(k,:)\}:$$

Beamnical MIMO channel covariance matrix.

$$H_{B_{k'_{n'}}} = R_R^{1/2} H_{B_{k'_{n'}}}^{iid} R_{Ts}^{1/2}:$$

Kronecker spatial correlation model of beamnical MIMO channel.

First Embodiment

Please referring to FIG. 1, FIG. 1 shows an antenna array communication system 1000. The antenna array communication system 1000 includes a base station 100 which is equipped with antenna arrays and a user equipment 200. The base station 100 is used for transmitting data to the user equipment 200 or receiving data from the user equipment 200. The user equipment 200 receives the data transmitted from the base station 100 to perform a plurality of processes, such as a calling process, a web browsing process, or a video streaming process. For example, the user equipment 200 can be a smart phone, a tablet computer or a notebook computer.

The base station 100 includes a transceiver unit 110, a processing unit 120 and a storing unit 130. The user equipment 200 includes a transceiver unit 210, a processing unit 220 and a storing unit 230. The transceiver units 110, 210 are used for transmitting and receiving data. For example, the transceiver units 110, 210 can be a combination of antennas, a RFIC, an amplifier and an analog/digital converter, or a circuit having a function of transmitting and receiving data, etc. The processing units 120, 220 are used for performing a plurality of calculating processes, a plurality of analyzing processes or a plurality of transferring processing. For example, the processing units 120, 220 can be a chip, a circuit board, a processor and a storage device storing a plurality of programming codes or a circuit having a function of calculating, analyzing or transferring. The storing units 130, 230 are used for storing data. For example, the storing units 130 230 can be a memory or a hard disk.

Figure 2:
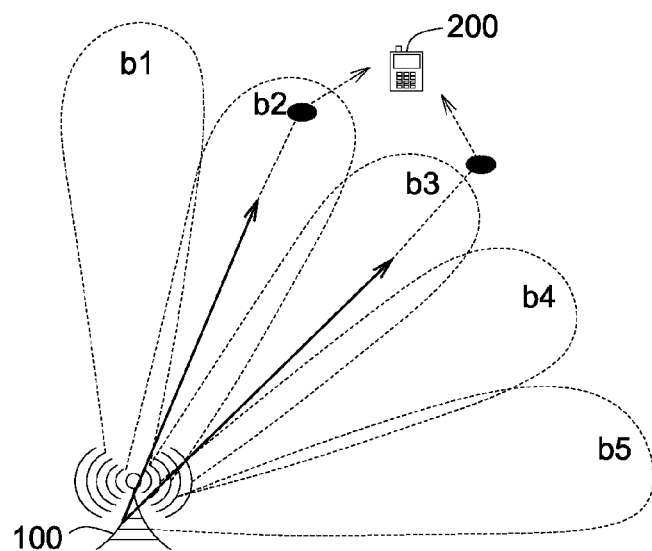
FIG. 2 shows a plurality beams transmitting from the base station to the user equipment according to the first embodiment.
Figure 3:
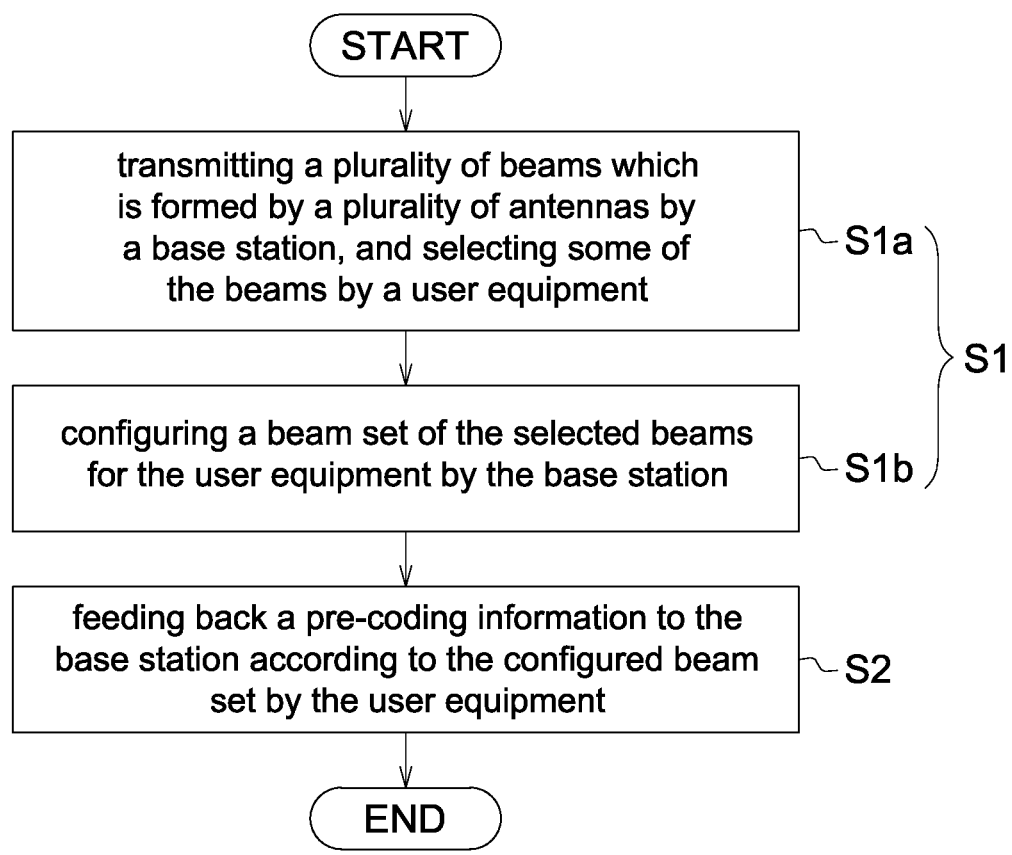
FIG. 3 shows a communicating method for the antenna array communication system according to the first embodiment.

Please referring to FIGS. 1 to 3, FIG. 2 shows a plurality of beams b1 to b5 transmitting from the base station 100 to the user equipment 200 according to the first embodiment and FIG. 3 shows a communicating method for the antenna array communication system 1000 according to the first embodiment. In FIG. 2, the antennas of the base station 100 are arranged in an array and forming the beams b1 to b5 by a beamforming technology.

For example, the beams b1 to b5 may be fixed at their direction. The transmitting capability between those beams of the user equipment 200 is depended on the location of the user equipment 200, the obstacle between the base station 100 and the user equipment 200 or the weather.

In the first embodiment, a two-stages scheme is provided. Referring to FIG. 3, the communicating method includes two stages S1 and S2, the stage S1 includes two steps S1a and S1b.

In step S1 a of the stage S1, a plurality of beams b1 to b5 which are formed by a plurality of antennas is transmitted by the transceiver unit 110 of the base station 100, and some of the beams b1 to b5 are selected by the user equipment 200. For example, the beams b2 and b3 are selected by the user equipment 200.

In one example of the step S1a, the processing unit 120 of the base station 100 may put different reference symbols on the beams b1 to b5. The processing unit 220 of the user equipment 200 detects the reference symbols of each beam b1 to b5 and the power thereof, and then selects some of the beams b1 to b5, whose power is larger than a threshold. For example, the power of the beams b2 and b3 which is emitted towards the user equipment 200 is larger than the threshold. Therefore, the beams b2 and b3 are selected by the processing unit 220 of the user equipment 200.

In another example of the step S1a, the processing unit 220 of the user equipment 200 may select some of the beams b1 to b5, according to a physical MIMO channel covariance matrix R. In one embodiment, the processing unit 220 of the user equipment 200 calculates the physical MIMO channel covariance matrix R and then calculates an eigenspace according to the physical MIMO channel covariance matrix R, i.e. U in the singular-value-decomposition $R=UDU^H$. Afterwards, the processing unit 220 of the user equipment 200 finds beams which is close to the eigenspace. For example, the beams satisfy the following equation under a given threshold $\gamma$.

$\|Ub_i\|<\gamma$, wherein $\|a\|$ is the Euclidean norm of a vector.

Those beams that satisfy the above equation are recorded to be selected and reported to base station 100.

In step S1b of the stage S1, a beam set of the selected beams for the user equipment 200 is configured by the processing unit 120 of the base station 100 based on the reported beams and other scheduling rule.

In one example of the step S1b, the processing unit 120 of the base station 100 configures the beam set of the selected beams considering interference to other user equipment. For example, another user equipment may be located near the beam b2, so the processing unit 120 of the base station 100 configures the beam b3 to be the beam set for avoiding an interference on the beam b2.

In another example of the step S1b, the processing unit 120 of the base station 100 configures the beam set of the selected according to mobility of the user equipment 200. For example, the user equipment 200 may move towards the beam b1, so the processing unit 120 of the base station 100 can include beams b1 into the beam set.

In stage S2, pre-coding information is fed back to the transceiver unit 110 of the base station 100 according to the configured beam set by the user equipment 200.

In one example of the stage S2, the pre-coding information includes a rank indicator (RI), a pre-code matrix indicator (PMI) and channel quality indicator (CQI).

Second Embodiment

Figure 4:
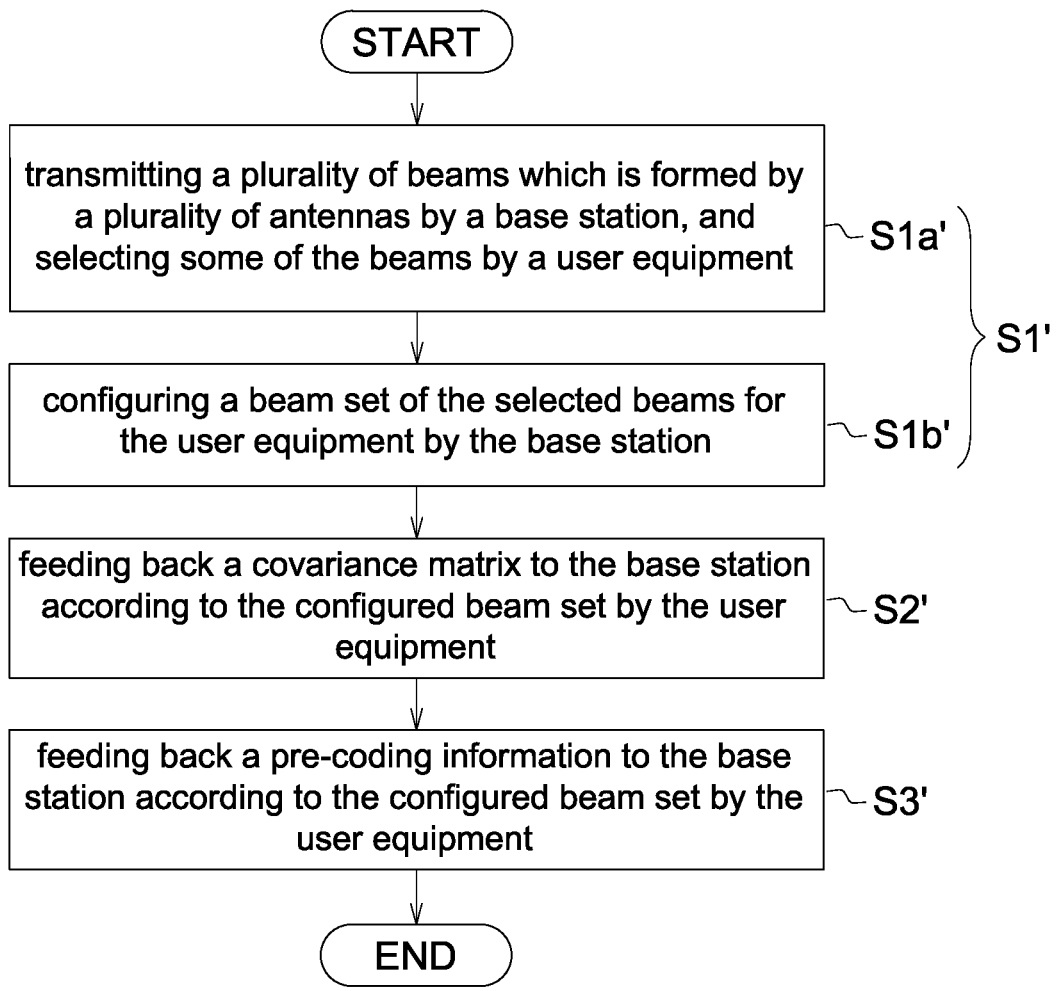
FIG. 4 shows a communicating method for the antenna array communication system according to the second embodiment.

Please referring to FIGS. 2 and 4, FIG. 4 shows a communicating method for the antenna array communication system 1000 according to the second embodiment. The communicating method of the second embodiment is different from the communicating method of the first embodiment in the number of stages.

Referring to FIG. 4, the communicating method includes three stages S1', S2' and S3', the stage S1' includes two steps S1a' and S1b'.

The step S1a' of the stage S1' is similar to the step S1a of the stage S1. The step S1b' of the stage S1' is similar to the step S1b of the stage S1. The stage S3' is similar to the stage S2. The similarity is not repeated here.

In step S2', a Beamnical MIMO channel covariance matrix $R_{Ts}$ or its eigenspace, i.e. U in the singular-value-decomposition $R_{Ts}=UDU^H$, is fed back to the transceiver unit 110 of the base station 100. At this step, the Beamnical MIMO channel covariance matrix $R_{Ts}$ is calculated by the processing unit 220 of the user equipment 200 according to the configured beam set.

In one embodiment, the user equipment 200 may feed back a plurality of rank-1 PMIs instead of the Beamnical MIMO channel covariance matrix $R_{Ts}$. After receiving those rank-1 PMIs, the processing unit 120 of the base station 100 can find the basis of the subspace spanned by those rank-1 PMIs to evaluate the eigenspace. One example to evaluate the eigenspace Q is by the QR decomposition of the matrix formed by concatenating column-wisely the rank-1 PMI, i.e. $[v_1 \ v_2 \ \ldots \ v_M]=QR$ where $\{v_i\}$ are the reported rank-1 PMI.

Usually, the total number of the bits of the plurality of rank-1 PMIs is less than the number of the bits of the covariance matrix or its eigenspace. Therefore, the feedback loading could be further reduced.

As describing above, when the antenna array is performed in FDD mode, the overhead loading could be reduced by the three-stages scheme using the beamforming technology.

As described above, the antenna array, for example, could be a massive antenna array. The base station 100, for example, is an eNB.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A communicating method for an antenna array communication system that includes user equipment and a base station, the communicating method comprising:
    transmitting a plurality of beams which are formed by a plurality of antennas of the base station to the user equipment;
    selecting a portion of the beams by the user equipment;
    configuring, by the base station, at least one of the beams that is selected by the user equipment and at least one of the beams that is not selected by the user equipment, to thereby form a beam set for the user equipment, wherein the at least one beam that is not selected is configured according to an expected location of the user equipment which is predicted according to a mobility of the user equipment, and the expected location is a location towards which the user equipment is moving; and
    feeding back pre-coding information to the base station according to the beam set by the user equipment.

2. The communicating method according to claim 1, wherein the base station puts a reference symbol on each of the beams.

3. The communicating method according to claim 2, wherein the selecting step further comprises:
    detecting power of each of the beams,
    selecting ones of the beams of which the power is larger than a threshold, and
    reporting the selected beams to the base station by the user equipment.

4. The communicating method according to claim 2, wherein the user equipment selects some of the beams according to a physical MIMO channel covariance matrix.

5. The communicating method according to claim 1, wherein the base station configures the at least one selected beam according to a plurality of scheduling rules of the user equipment.

6. The communicating method according to claim 1, wherein the at least one selected beam is configured according to the mobility of the user equipment.

7. The communicating method according to claim 1, wherein the pre-coding information is a rank indicator (RI).

8. The communicating method according to claim 1, wherein the pre-coding information is a pre-code matrix indicator (PMI).

9. The communicating method according to claim 1, further comprising:
    feeding back a Beamnical MIMO channel covariance matrix to the base station according to the beam set by the user equipment.

10. User equipment of an antenna array communication system that includes the user equipment and a base station, comprising:
    a transceiver unit that receives a plurality of beams which are formed by a plurality of antennas from the base station; and
    a processing unit that selects a portion of the beams, wherein
    at least one of the beams selected by the processing unit and at least one of the beams not selected by the processing unit are configured to form a beam set for the user equipment by the base station, the at least one beam not selected by the processing unit is configured according to an expected location of the user equipment which is predicted according to a mobility of the user equipment, and the expected location is a location towards which the user equipment is moving, and
    pre-coding information is obtained according to the beam set by the processing unit and fed back to the base station by the transceiver unit.

11. The user equipment according to claim 10, wherein the processing unit detects power of each of the beams and then selects ones of the beams of which the power is larger than a threshold.

12. The user equipment according to claim 10, wherein the processing unit selects some of the beams according to a physical MIMO channel covariance matrix.

13. The user equipment according to claim 10, wherein the pre-coding information is a rank indicator (RI).

14. The user equipment according to claim 10, wherein the pre-coding information is a pre-code matrix indicator (PMI).

15. The user equipment according to claim 10, wherein the processing unit further obtains a Beamnical MIMO channel covariance matrix according to the beam set and the transceiver unit further reports the Beamnical MIMO channel covariance matrix to the base station.

16. The user equipment according to claim 15, wherein the user equipment feeds back a plurality of Rank-1 pre-code matrix indicators (PMIs) and the base station estimates an eigenspace of the Beamnical MIMO channel covariance matrix.

17. A base station of an antenna array communication system that includes user equipment and the base station, comprising:
    a transceiver unit that transmits a plurality of beams which are formed by a plurality of antennas, wherein a portion of the beams are selected by the user equipment; and
    a processing unit that configures at least one of the beams selected by the user equipment and at least one of the beams not selected by the user equipment, to thereby form a beam set for the user equipment, wherein
    the at least one beam not selected by the user equipment is configured according to an expected location of the user equipment which is predicted according to a mobility of the user equipment, and the expected location is a location towards which the user equipment is moving, and
    the transceiver unit receives pre-coding information which is obtained according to the beam set by the user equipment.

18. The base station according to claim 17, wherein the processing unit puts a reference symbol on each of the beams.

19. The base station according to claim 17, wherein the processing unit configures the at least one selected beam according to a plurality of scheduling rules of the user equipment.

20. The base station according to claim 17, wherein the processing unit configures the at least one selected beam according to the mobility of the user equipment.

21. The base station according to claim 17, wherein the transceiver unit further receives a Beamnical MIMO channel covariance matrix, an eigenspace of the Beamnical MIMO channel covariance matrix or a plurality of Rank-1 pre-code matrix indicators (PMIs) for the Beamnical MIMO channel covariance matrix which is obtained according to the beam set by the user equipment.

* * * * *